April 22, 1941.   C. C. BRADBURY   2,238,989
SELF-BALANCING DYNAMIC SYSTEM
Original Filed Feb. 20, 1936   4 Sheets-Sheet 3

Inventor
Clifford C. Bradbury
Attys.

April 22, 1941.   C. C. BRADBURY   2,238,989
SELF-BALANCING DYNAMIC SYSTEM
Original Filed Feb. 20, 1936   4 Sheets-Sheet 4
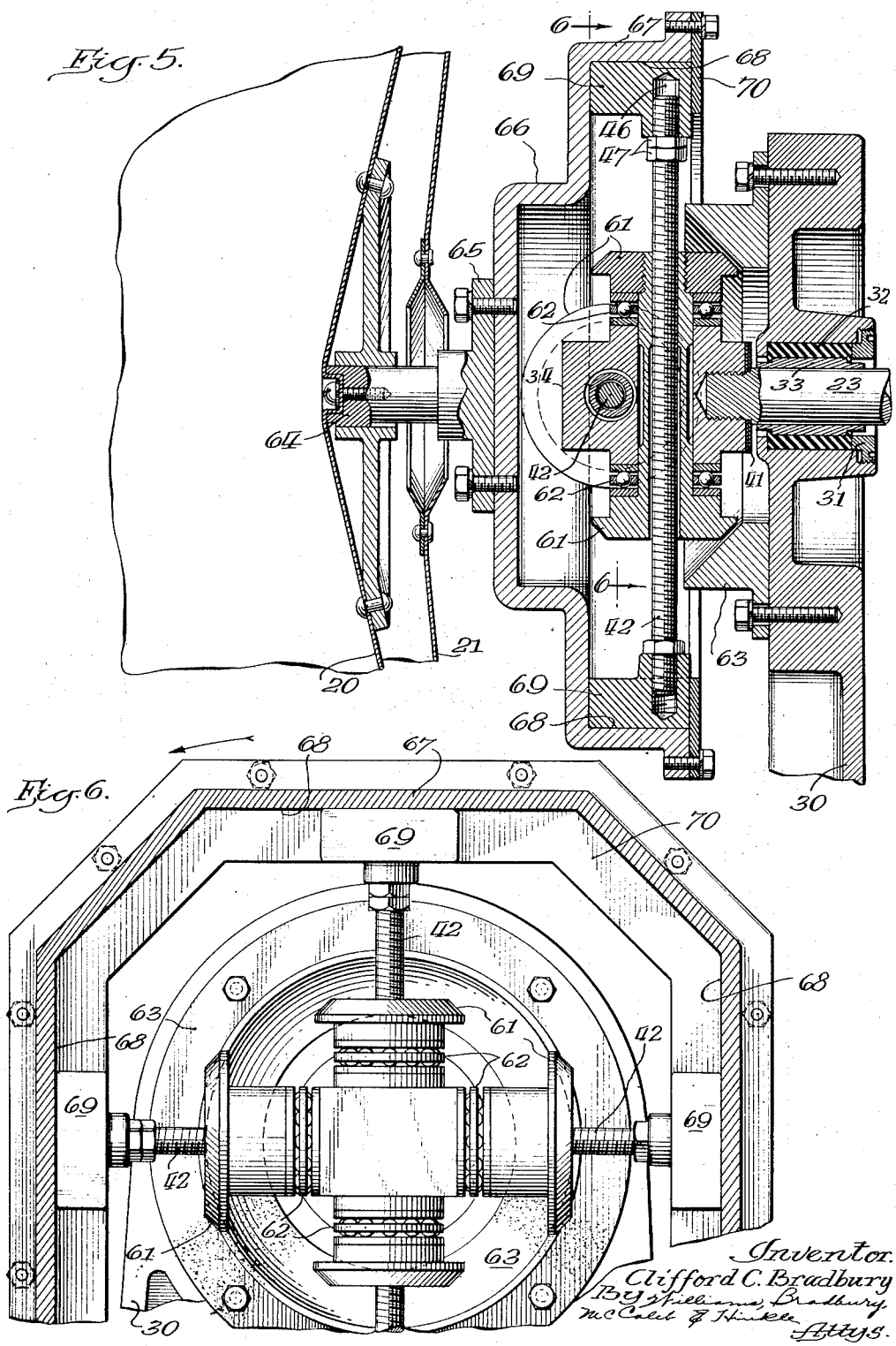
Inventor.
Clifford C. Bradbury Patented Apr. 22, 1941

2,238,989

UNITED STATES PATENT OFFICE 2,238,989

SELF-BALANCING DYNAMIC SYSTEM

Clifford C. Bradbury, Glencoe, Ill., assignor, by mesne assignments, to Bendix Home Appliances, Inc., South Bend, Ind., a corporation of Delaware Original application February 20, 1936, Serial No. 64,992. Divided and this application December 20, 1937, Serial No. 180,712

3 Claims. (Cl. 74—573)

In any dynamic system an unbalanced condition may arise in which fluctuating centrifugal or other forces cause excessive vibration. Such a condition is frequently very difficult to correct. Most centrifugal machines, for example, cannot be loaded with sufficient uniformity to keep vibration from occurring at high speeds. Such machines must be securely fastened to their foundations and elaborate cushioning devices must be provided to absorb the vibration incident to their operation.

The present application is a division of my application Serial No. 64,992 filed February 20, 1936.

In accordance with the present invention, dynamic systems are made self-balancing to obviate the difficulties referred to above. A portion of the rotating body in the dynamic system is shifted with respect to its axis of rotation in such a manner that forces are centrifugally created which counteract the forces originally causing the unbalanced condition of the system.

The principal object of the invention is to provide a dynamic system which is automatically and reliably self-balancing and which remains self balancing for an indefinite length of time.

A further object of the invention is to provide a self-balancing dynamic system in which a portion of the rotating body is shifted in such a direction as to shift the center of inertia in a direction opposite to the displacement resulting from an unbalanced condition.

Another object of the invention is to accomplish this shifting by driving means motivated by torque derived from the rotation of the body and constructed in a novel manner to minimize noise and wear of moving parts.

A further object of the invention is to provide a new and novel self-balancing system in which the portion of the rotatable body that is shifted is the major or load carrying part.

A further object is to provide a system of the type described in the preceding paragraph in which the shifting mechanism is sealed from the load carrying portion whereby it is adapted particularly for use in connection with apparatus in which the load comprises fluid matter.

Another and further object of the present invention is to provide a self-balancing dynamic system in which the direction of movement of the movable portion of the rotating body may be adjusted to overcome the lag of the displacement of the rotating body behind the impulse causing the displacement.

Other specific objects and advantages of the present invention will become apparent from the ensuing description in which reference is had to the accompanying drawings illustrating apparatus embodying the invention.

Fig. 5 is a vertical longitudinal section showing a further modification of the present invention; and Fig. 6 is a vertical transverse section taken along the line 6—6 of Figure 5.

Figure 1:
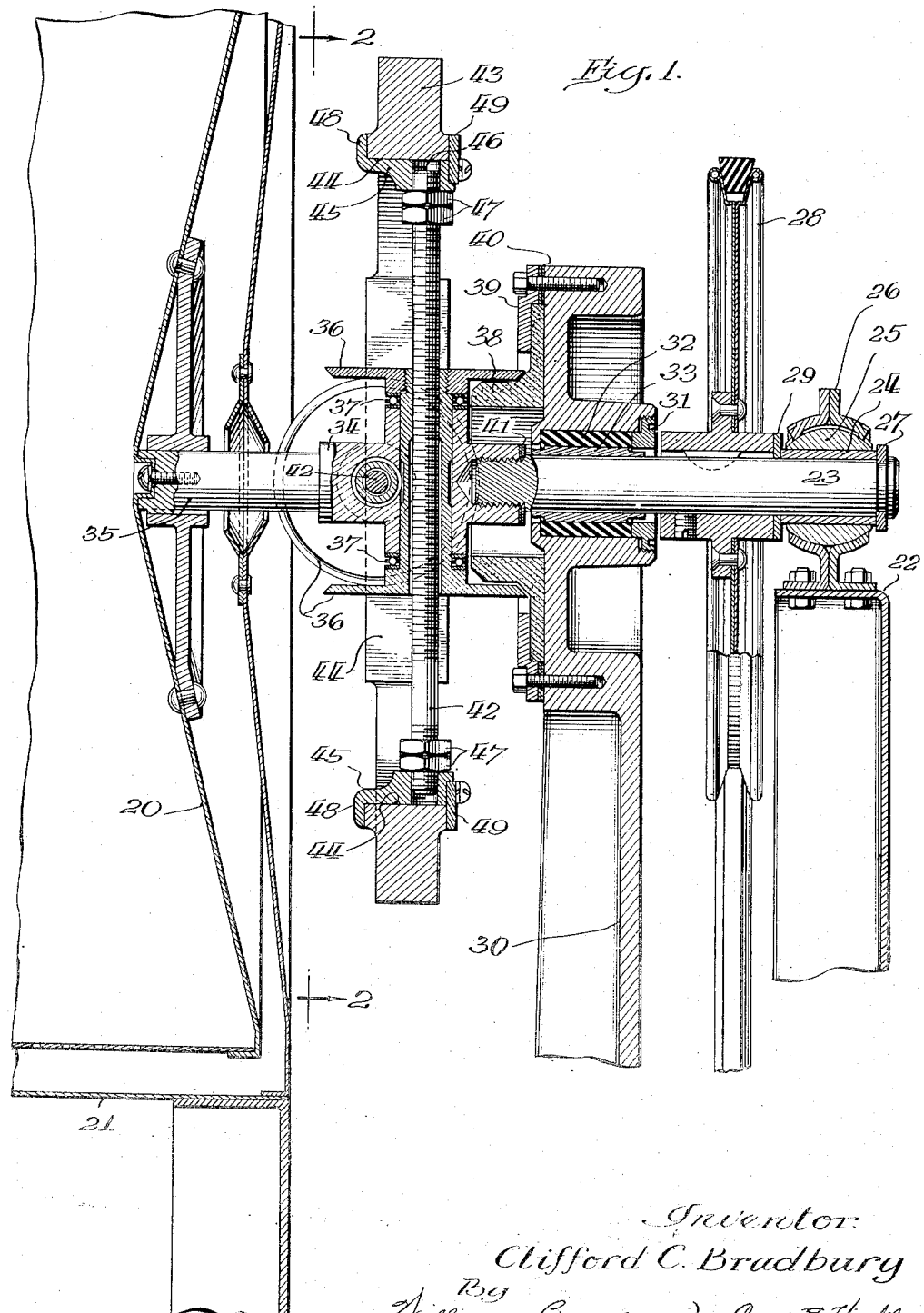
Fig. 1 is a vertical longitudinal section of a form of centrifuging apparatus embodying the invention.

The specific drawings and description thereof that follows merely disclose illustrative embodiments of the invention and are not to impose limitations upon the claims.

In general, the self-balancing dynamic system of the present invention includes a rotary primary body, a secondary body and a yieldable mounting that permits relative displacement of the rotating primary body, and the secondary body to occur when the system is out of balance. The specific embodiment shown in the drawings simply provides a single rotatable body and a yieldable mounting that permits centrifugal displacement of the body during its rotation whenever its center of inertia lies off its axis of rotation.

In all the illustrated embodiments the invention is applied to centrifugal apparatus including a perforated centrifuging drum 20 surrounded by an imperforate curb 21 which catches liquid thrown outward through the perforations.

The drum is driven by means of a drive shaft 23 journaled in a bushing 24 which is pressed into a bored spherical bearing block 25. The latter is free to rock in a spherical housing 26 suitably secured to a base 22. The drive shaft 23 is held against axial displacement by a Cwasher 27 on the rear end of the shaft and a driving pulley 28 fixedly secured to the shaft and bearing against a washer 29 turning against the front end of the bushing 24. The bearing block is self aligning and does not prevent gyratory movement of the drive shaft.

The front bearing provides a yieldable mounting that permits slight gyration or centrifugal displacement of the shaft. In the frame 30 is an annular socket having a restricted opening at its front end through which the shaft passes, and a counter-tap at its rear end adapted to receive a threaded collar 31. Compressed into the annular socket by the collar 31 is a rubber sleeve 32 which has a bearing bushing 33 vulcanized to its interior. By adjustment of the collar 31, the compression of the rubber sleeve 32 and thus the yieldability of the shaft mounting may be varied.

In all embodiments there is provided a driving means adapted to be rendered effective whenever an out of balance condition of the system causes a predetermined displacement of the rotating body. Driven by this means is a means for shifting a portion of the rotating body in such a direction as to prevent this excessive displacement. In the forms of the invention illustrated in the drawings, the driving means that is operative when the aforesaid displacement occurs is motivated by torque derived from the rotation of the body upon which it is mounted. As will appear later, this type of driving means is relatively simple in construction and therefore is desirable, but other types may be utilized without departing from the invention.

Each embodiment in addition is provided with means for locking the shifting means against reverse motivation. The purpose of the locking means is to prevent the shifting from being caused by centrifugal force and this purpose may be accomplished by provision of any suitable device for irreversibly transmitting power from the driving to the shifting means. An irreversible power transmitting means is contemplated as being a means of the type adapted to transmit power in one direction only. Thus when the shifting means is a radially movable spindle, as in the illustrated apparatus, it may be threaded, using threads of a pitch preventing rotation of the spindles by centrifugal force, through a portion of the rotatable body that is radially immovable relatively to the shaft. For shifting the radial spindles, rotary driving members may be provided on the rotating body which are driven during the displacement of the body that results from its out of balance condition.

In each embodiment of the invention, two non-parallel radial spindles are provided. The spindles are located substantially at right angles to each other and are displaced axially of the drive shaft. Each has associated therewith two rotary driving members, one for driving the spindle in one radial direction, and the other for driving the spindle in the opposite direction. The spindles preferably pass through the rotary members so that they may be directly driven thereby, and it is also preferable for the rotary members to be threaded on the spindles whereby the latter are moved radially upon the rotation of the driving members.

Figure 2:
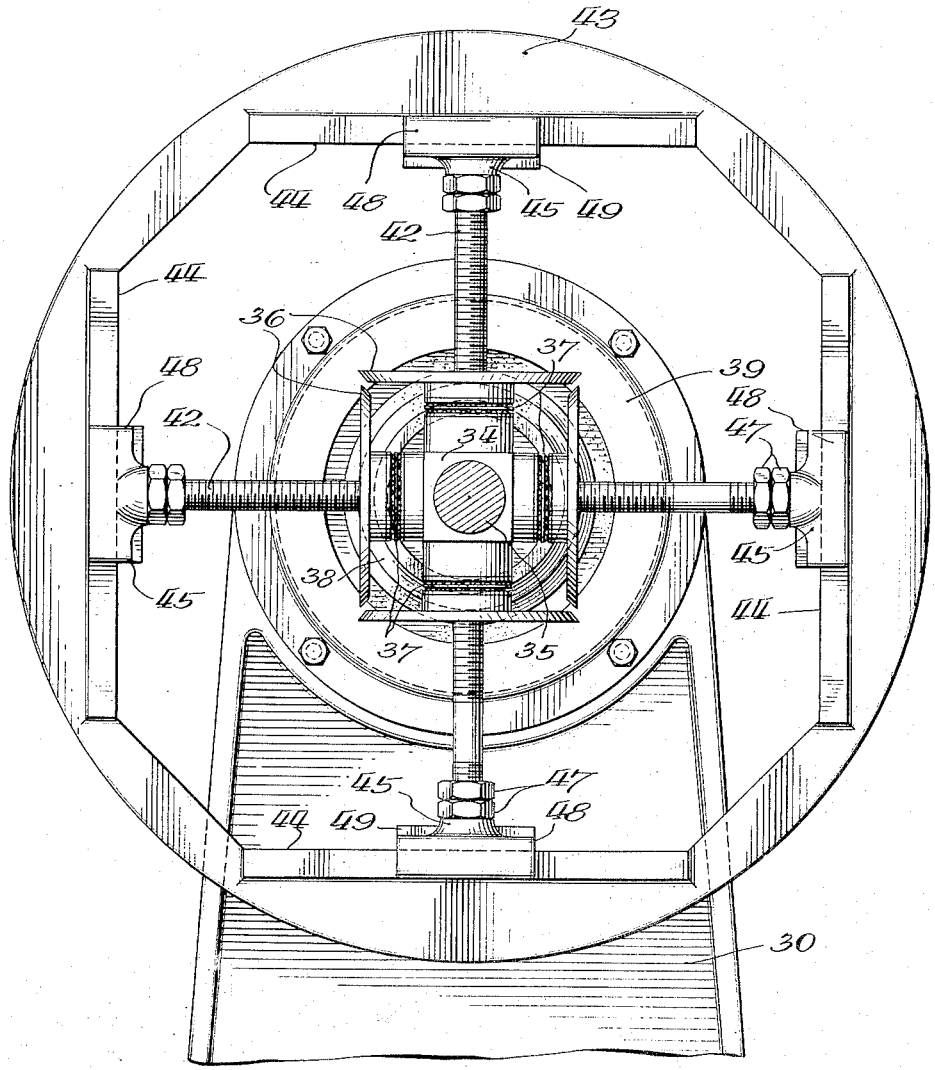
Fig. 2 is a vertical transverse section taken on the line 2—2 of Figure 1.

Referring now specifically to Figures 1 and 2, it may be noted that the drum 20 is driven directly by the drive shaft 23 through a head block 34 and an extension shaft 35. The head block is screwed on to the front end of shaft 23 and serves as a support for the drum. The rotary driving members 36, illustrated as bevelled rollers, are mounted upon opposite ends of two journals passing through the head block. Ball thrust bearings 37 are interposed between the inside surfaces of the roller hubs and the head block 34. The bevelled rollers are driven during centrifugal displacement of the drive shaft 23 and head block 34 by rolling contact with two conical surfaces on a track 38 carried by the frame 30 that supports the front bearing of the drive shaft.

The arrangement of the two conical surfaces on the track 38 of Figure 1 is such that the bevelled rollers 36 may all be of the same size. Two of the bevelled rollers are shown in engagement with the outer conical surface, and one of the other two bevelled rollers is shown in phantom engaging the inner conical surface. The slope of each conical surface is such that an imaginary continuation of the cone would have its apex at the point of intersection of the axis of the drive shaft 23 with the axis of the two rollers that engage the surface. Thus, there is true rolling contact of the bevelled rollers 36 with the surfaces without any grinding action. In order to minimize noise and to provide sufficient friction without rapid wear, the track 38 is preferably constructed of fiber or of moulded composition.

The track is fixedly secured to the front side of frame 30 by means of an annular clamping bracket 39 which has a machined surface bearing against the track 38 and is screwed to the frame 30. Shims 40 may be provided between the annular clamping bracket and the frame so that the distance between the machined surface on the bracket and the machined surface on the frame may be adjusted to compensate for wear. Axial adjustment of the head block 34 may also be made possible by provision of shims 41 between the head block and the shoulder on the shaft 23 against which it is screwed. When the apparatus is assembled, the clearance between the rollers and the track should be just as small as manufacturing tolerances permit.

The degree of compression of the rubber sleeve 32 is such that the rotating mass when unbalanced can centrifugally deflect only far enough to cause the beveled rollers to contact the track firmly. Location of the center of inertia of the rotating mass materially off the axis of rotation causes one or two of the bevelled rollers 36 to contact the track when a high speed of rotation is attained. Then the spindle 42 that is threaded through the driven roller is shifted in a direction opposite to the displacement of the rotating mass that caused the roller to contact the stationary track. The drive shaft 26 always rotates in the same direction so that each spindle is driven in one direction when one of its rollers contacts the stationary track, and in the other direction when its other roller contacts the track.

From the preceding description, it may be noted that two shifting means have been provided and that these are adapted to move a portion of the rotating assembly in radially non-parallel directions. To permit coordinated movement of the movable portion by the shifting means, the latter is slidably connected to the movable portion in a manner now about to be described.

In the embodiment of Figures 1 and 2, the movable portion of the rotatable body is a steel ring 43 which is heavy enough so that it can be used to balance the whole rotating mass. It is provided with four inwardly directed machined surfaces 44 against which the supporting shoes 45 are adapted to slide. The shoes are provided with machined outer surfaces that bear against the machined surfaces of the steel ring.

The shoes are mounted on the spindles by providing them with tapped holes 46 into which threaded ends of the spindles extend and are spaced a fixed distance apart by nuts 47. Where the holes in both of the shoes associated with each spindle are threaded, the threads in one shoe are right handed and in the other, left handed so that the two shoes may be adjusted to the exact distance apart desired. The ring 43 is slidably held between the flange 48 on each of the shoes and a retaining plate 49 screwed to the side of the shoe opposite the flange.

When the apparatus described above is in operation and the speed of rotation is sufficient to cause the unbalanced rotating mass to move radially off its axis of rotation, one or two of the rollers contact the track so that the spindles are driven in such a direction as to shift the weight that they support in a direction opposite to the direction of displacement of the rotating mass. When the center of inertia of the rotating mass has thus moved nearly to the axis of rotation, the centrifugal force acting upon the rotating mass as a whole becomes insufficient to keep the spring or rubber in the yieldable shaft mounting compressed so that the shaft is returned into axial alignment with the axis of rotation. Should any subsequent shifting of a portion of the rotating mass cause its center of inertia again to get off the axis of rotation, the weight carried by the spindles is instantly shifted in the same manner as before to balance the rotating mass. The same holds true in cases where the rotating mass is a variable one.

It should be noted that in the described system, the rotary driving members 36 are so located and arranged with respect to the spindles 42 and the movable ring 43 that the latter is moved in opposite directions along paths intersecting each other substantially at right angles and passing through the axis of rotation of said driving members. This arrangement results in movement of the ring in a direction opposite to the displacement, that is, the movement of the ring is 180° out of phase with respect to the displacement of the shaft.

However, it has been found that the maximum displacement of the shaft may occur in a radial direction angularly behind the radial direction in which the center of inertia of the rotating mass lies off the axis of rotation. In other words, movement of the rotating mass may lag in phase behind the impulse that causes it—this impulse resulting from the out of balance load in the drum. This lag may be overcome by modifying the embodiment of Figures 1 and 2 as illustrated in Figures 3 and 4.

To overcome the lag in movement of the rotating mass behind the impulse causing it, the angle between the slidable connection intermediate the spindles 42 and the movable ring 43 is made adjustable. According to this arrangement, means are provided for shifting the angle between the direction of movement of the ring and the direction of the displacement and, therefore, between the former and the axes of rotation of the driving members which are in phase with the displacement.

Figure 3:
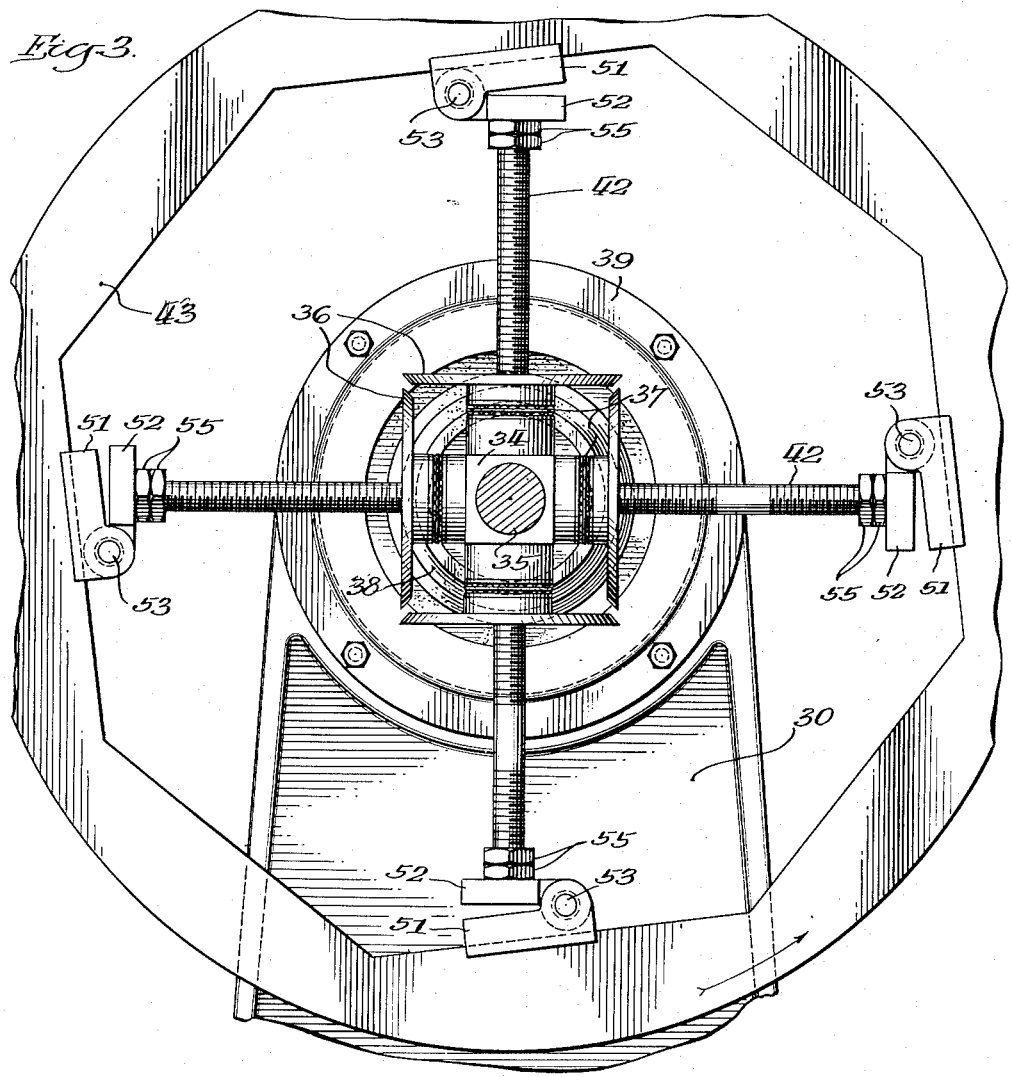
Fig. 3 is a view similar to Figure 2 of a modified form of the invention.
Figure 4:
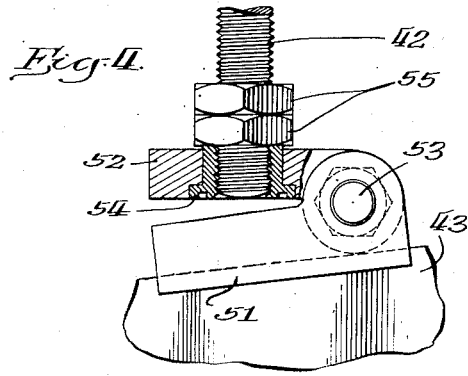
Fig. 4 is an enlarged elevation partly in section of one of the supporting shoes illustrated in Figure 3.

Referring now more particularly to Figures 3 and 4, it may be noted that the shoes are made in two sections, the outer section 51 being provided with the usual machined surface, and the inner section 52 being adjustable to any desired angle with respect to the outer section by means of a screw 53. The inner section 52 is provided with a bore and a counterbore in which may rotate a flanged collar 54 which is threaded on the end of the spindle 42 and locked in place on the spindle by means of lock nuts 55. The angle at which the inner section 52 is inclined to the outer section 51 of the shoe may be adjusted in accordance with the lag in phase.

When the assembly shown turns in a counter-clockwise direction, the radial direction in which the ring 43 is moved by one of the spindles 42 should be ahead in phase of the plane passing through the axes of the two rollers that drive the spindle. If the angle between the inner and outer sections of the shoes is made smaller, the collars 54 and lock nuts 55 must, of course, be moved outward along the spindles far enough so that the shoes may bear firmly against the machined surfaces of the ring 43. Decreasing the angle between the sections of the shoes brings the machined surfaces of the ring more nearly perpendicular to the spindles 42, and thus decreases the phase angle between each spindle and the planes of the two corresponding roller axes. Increasing the angle, on the other hand, increases the phase angle.

In the above described modifications, a ring rotating with and constituting a minor portion of the rotatable body has been moved with respect to another portion to balance the system. In the modifications of Figures 5 and 6 now about to be described, a major rather than a minor portion of the rotating body is shifted by the spindles. The major portion referred to is the load carrying part of the system. In the illustrated embodiment, this is the centrifuging drum 20.

This modification differs from the preceding ones in that all the rotary driving members are adapted to engage a single conical surface of a track and the rotary driving members are of different sizes and are not arranged for true rolling contact.

Referring now specifically to the figures, it may be seen that the non-radial spindles 42 are driven by four bevelled rollers 61 having their inner faces separated from the head block 34 by ball thrust bearings 62. All the rollers engage the single conical surface of a track 63 fixedly screwed to frame 30. The latter also supports a bearing similar in all respect to that of the previous modifications.

The system of Figures 5 and 6 should be rotated in a counter-clockwise direction as illustrated by the arrow in Figure 6. The direction in which the shaft must be rotated in the present or preceding embodiments can be changed by simple substitution of spindles with right hand threads for spindles of left hand threads or vice versa as the case may be.

The load carrying perforated drum 20 is secured to the end of a stub shaft 64 having an annular flange 65 mounted by screws upon a recessed plate 66. Surrounding the plate is a flange 67 having four machined inner surfaces 68 against which slide four shoes 69 mounted in a previously described manner upon the spindles 42. An annular plate 70 is secured to the edge of the flange 67 to retain shoes 69.

An advantage of the described arrangement is that it provides a construction by means of which the load carrying portion can be shifted by a mechanism located outside of and sealed from that portion. This is very desirable in apparatus of the type disclosed in which the load carrying portion is designed to carry fluid material.

When the system is rotated at a sufficient speed, and if it is out of balance, then upon the occurrence of predetermined displacement, certain of the rollers engage the track and are positively driven to shift the major load carrying portion of the rotatable body in a direction opposite to the displacement. In this case, the drum itself is shifted to balance the system and consequently, it may run out of center, but because of its considerable weight, the shift will not be pronounced.

The embodiments of the invention that have been described may be modified and various devices embodying the substance of the invention may be constructed to meet various requirements.

What I claim as new and desire to secure by United States Letters Patent is:

1. In a self-balancing dynamic mechanism, in combination, a rotatable primary system, a substantially horizontal shaft forming a part of said system, means for rotating said shaft, a relatively stationary secondary body, a yieldable mounting that permits relative displacement of the rotating primary system and the secondary body to occur when the primary system is out of balance, a plurality of bevelled rollers on the primary system rotatable on non-parallel radial axes, a conical track on the secondary body for driving engagement with the rollers during such displacement, and means comprising spindles passing radially through the rollers for shifting a portion of the primary system in such a direction as to prevent the displacement when the rollers are driven, said spindles being locked by friction against radial movement when the rollers are not being driven.

2. In a self-balancing dynamic mechanism, in combination, a rotatable primary system, a relatively stationary secondary body, a substantially horizontal shaft supporting said primary system, means for rotating said shaft, a yieldable mounting that permits relative displacement of the rotating primary system and the secondary body to occur when the system is out of balance, a plurality of rollers forming a part of the primary system having conical surfaces rotatable on non-parallel radial axes, a conical track on the secondary body for driving engagement with the rollers upon predetermined displacement, and means comprising spindles passing radially through the rollers for shifting a portion of the primary system in a direction opposite to the displacement when said rollers are driven, the slopes of the conical surfaces of the rollers and track being such that an imaginary continuation of the cone would have its apex at the point of intersection of the axis of rotation of the rotatable primary system and the axis of rotation of the rollers, whereby true rolling contact of the rollers with the track is obtained.

3. In a self-balancing dynamic mechanism, the combination including a rotatable primary system, a relatively fixed secondary body, a shaft forming part of said primary system, means for rotating said shaft and primary system, a yieldable mounting that permits relative displacement of the rotating primary system and fixed secondary body to occur when the primary system is out of balance, a plurality of rollers having conical surfaces mounted for rotation upon axially displaced and non-parallel radial axes forming a part of said primary system, means comprising spindles passing radially through and in threaded engagement with said rollers for shifting a portion of the primary system in directions opposite to said displacement, and conical tracks axially displaced adapted to be engaged by said rollers upon predetermined displacement of said system and body.

CLIFFORD C. BRADBURY.